United States Patent
Fienblit et al.

(10) Patent No.: US 7,617,484 B1
(45) Date of Patent: Nov. 10, 2009

(54) CONCERN BASED HOLE ANALYSIS

(75) Inventors: Shachar Fienblit, Ein Ayala (IL); Eitan Farchi, Pardes Hana (IL); Moran Shochat, Zichron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/186,277

(22) Filed: Aug. 5, 2008

(51) Int. Cl.
*G06F 9/45* (2006.01)
(52) U.S. Cl. .................................................... 717/124
(58) Field of Classification Search .................. 717/124
See application file for complete search history.

(56) References Cited

U.S. PATENT DOCUMENTS

| 5,754,760 | A | 5/1998 | Warfield |
| 7,039,902 | B2 | 5/2006 | Kuzmin et al. |
| 7,499,718 | B2 * | 3/2009 | Stephenson et al. ......... 455/513 |
| 2005/0081104 | A1 | 4/2005 | Nikolik |
| 2007/0168727 | A1 | 7/2007 | Fournier et al. |

* cited by examiner

*Primary Examiner*—John Chavis
(74) *Attorney, Agent, or Firm*—King & Spalding LLP

(57) ABSTRACT

A computer program product including computer usable media having computer usable program code for ranking coverage over subsets of code by combining coverage measure with concern based criteria for each code subsets, ordering the code subsets by the combination of coverage measure and concern based criteria, and outputting to a user the ordered code subsets.

1 Claim, 1 Drawing Sheet

CONCERN BASED HOLE ANALYSIS

BACKGROUND OF THE INVENTION

1. Field of the Invention

This invention relates to technology for ranking subsets of software code based on coverage and at least one concern based criterion.

2. Description of Background

Coverage tools are aimed at measuring what part of the code is executed during tests of a program. Hole analysis is a technique used to present coverage data in an informative way by finding uncovered subsets of the code, e.g., functions, basic blocks files, that share some common property, e.g., subsets of uncovered functions that share a certain sub-string in their name. Hole analysis is disclosed in U.S. patent application Ser. No. 12/144,666 filed, Jun. 24, 2008, and incorporated in its entirety herein by reference. Typically, coverage tasks, e.g., functions, are grouped into subsets with a common property, e.g., common sub-string in the function names. Then groups are ranked by some measure of the quality of their coverage as a group, e.g., the number of uncovered functions in the group divided by the total number of functions in the group. However, hole analysis is typically based on coverage data only. In the above example for instance, this would be a Boolean flag for each function that indicates whether or not the function was covered.

A drawback of that approach is that ranking of holes is done only by their coverage and not by any other criteria, thus not leveraging additional information available for the project. As a result, some non-significant holes can be reported and possibly ranked higher than significant holes. As a simple example of this drawback, one can think of a set of functions that implement a functionality that is no longer required and therefore does not have to be tested. Hole analysis that is based only on the coverage criterion will report this set of functions as a higher ranked hole if this hole contains many functions. To date, no hole analysis technique is using non-coverage criteria to highlight significant holes and to eliminate non-significant holes.

SUMMARY OF THE INVENTION

The technology includes computer program products on a computer usable medium with code for finding subsets of code with some common property and ranking the subsets according to their coverage data and concern based criteria. A "concern based criterion" is a criterion that can be measured for a given piece of code and its value is related to a probability of finding a problem (bug) of a specific kind (concern) in this code. At least one coverage measure is combined with at least one concern based criteria for each code subset. The concern based criteria includes at least one from the group of: code complexity, number of recent changes in the code, number of review issues over a user-selected period, number of reported bugs, location of reported bugs, and number of primitives of a user-selected function type. The code orders the subsets by the combination of coverage measure and at least one concern based criteria, and outputs to a user the ordered code subsets. The technology has utility in that it considers the probability of finding a problem (bug) of a specific kind (concern) in the untested code when prioritizing which untested code to target for further testing.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
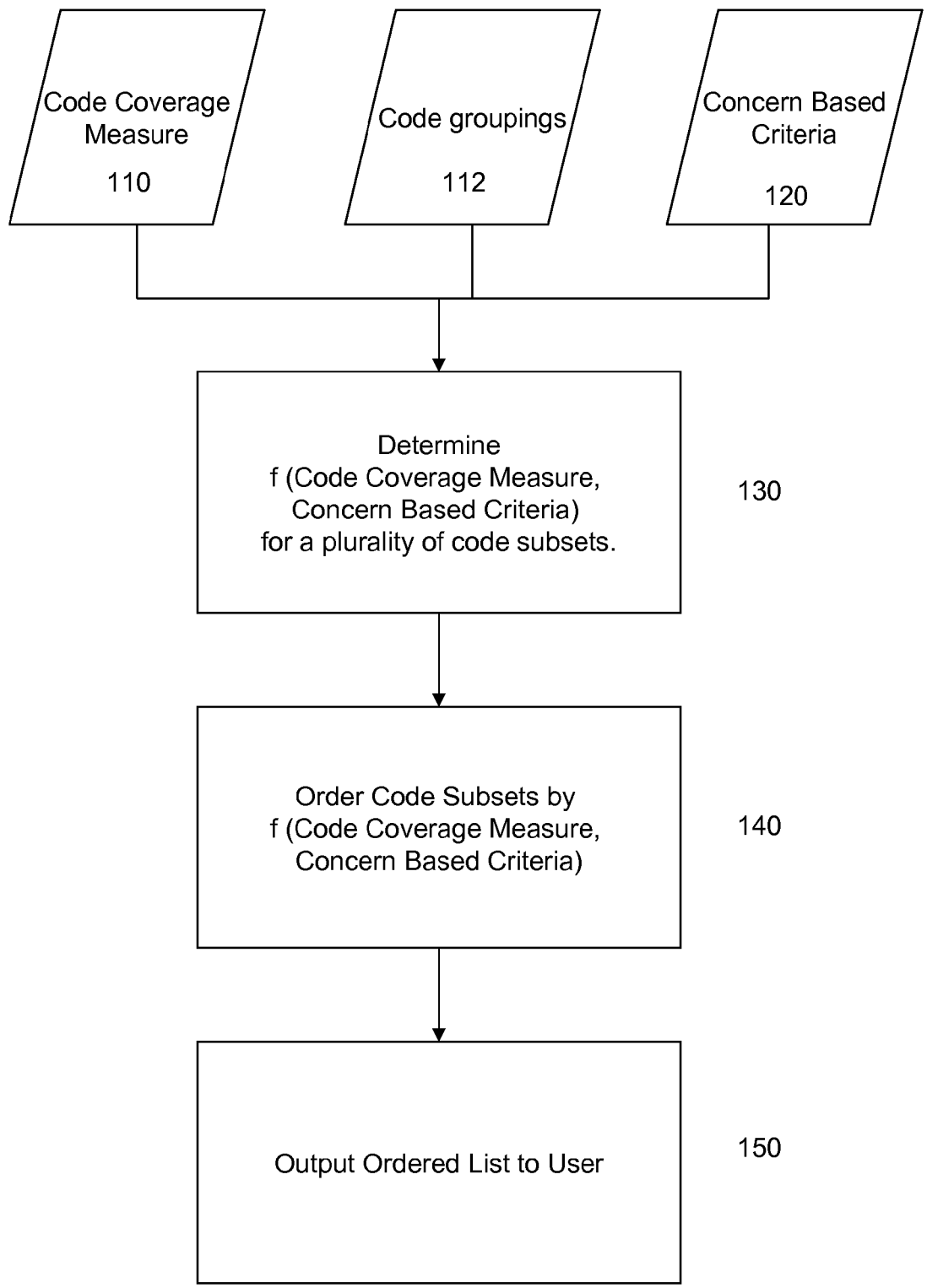
FIG. 1 illustrates a schematic diagram of tasks performed by computer code of the present technology.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Referring to FIG. 1, the present technology includes systems, methods, and computer program products for including concern based ranking criteria 120 to the hole analysis. A concern based ranking criteria could be, for example, the number of changes that were made to the code over a user-selected period. Recent changes in the code is a valuable information that can be used to better direct the coverage improvement effort, e.g., as disclosed in U.S. patent application Ser. No. 12/058,774, filed Mar. 31, 2008 and incorporated in its entirety herein by reference. The following are further examples of the criteria, metrics, variables that can be used as a criterion for holes ranking: code complexity—there are various code complexity metrics (e.g. McCabe Cyclomatic Metric), but in general, the more complex the code function is, the higher chances for finding bugs; review statistics—the more review issues found in the code of the function, the higher need to cover this function in testing and the higher the likelihood that the code contains bugs; bug statistics—statistics of the location of bugs and their severity, field bugs are much more expensive than unit test bugs, the more sever bugs found in the code of the function the higher need to cover this function in testing; bug patterns—rank the functions according to the number of primitives of a user-selected type. For example, if our concern is bugs related to concurrency then functions with a lot of concurrency primitives (lock, wait, mutex, etc.) will be ranked higher.

By adding concern based criteria to the hole analysis the technology can sort the list of reported holes by their significance, reduce the ranking of less significant holes and better direct the effort of creating new tests to improve the code coverage. The technology is not limited to function level hole analysis only. It can be easily adapted to other coverage levels such as file coverage or basic block coverage.

The technology can be implemented by changing the ranking function of the holes. Note that the technology is described with one additional criterion (concern based) but also includes multiple criteria. In Hole Analysis with coverage data only, the holes are ranked according to a metric that depends on the coverage only, for example: rank=logarithm (uncovered_elements/covered_elements). While ranking functions other than logarithm (<ratio of combination of criteria>) is used to illustrate exemplary embodiments herein, other functions can be used.

In embodiments of the present technology, after grouping the code 112 at least one additional concern based criterion 120 is used in addition to the coverage measure 110 in applying the ranking function 130. If we choose the "recently changed" criterion for instance, the above will change to: rank=logarithm (uncovered_elements+changed_elements)/(covered_elements+unchanged_elements)). Holes with many uncovered elements that have recently changed get high rank which makes them good candidates for coverage improvement. On the other hand, holes with many covered elements that have not recently changed get low rank and therefore can be ignored. In general, rank=f(coverage, additional concern based criteria).

In order to get even better sorting of holes the Boolean flag can be replaced with a value between 0" and maximum, e.g., "1." Minimum can stand for no change at all and maximum is the maximal number of changes for one function (normalized by function size).

The technology is novel at least in ranking coverage data according to one or more concerns/risks. In general, uncovered tasks with high risk are more important than uncovered tasks with low risk and therefore should be reported first. Uncovered tasks can be specified for different levels, e.g.: 1. Basic Blocks (BB), 2. Functions, 3. Files, 4. Groups of BB/Functions/Files (e.g., holes). Coverage level can be either Boolean flag (e.g., covered/uncovered) or a scale (e.g., according to the number of times this task was covered).

Examples for interesting concerns/risks include: recently changed, code complexity, review statistics, bug statistics, and bug patterns. After determining the ranking function for a plurality of code subsets, a plurality of code subsets are ordered 140 according to rank. The uncovered tasks are then reported to the user 150 according to a rank that combines the coverage level and the risk level.

The technology can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer program product having computer program code stored in a memory when executed by a processor for ranking coverage over subsets of code, said computer program product comprising:

program code for combining at least one coverage measure with at least one concern based criterion for each of a plurality of code subsets; wherein the concern based criterion includes at least one from the group consisting of: code complexity, number of recent changes in the subsets of code, number of review issues over a user-selected period, number of reported bugs, location of reported bugs, and number of primitives of a user selected function type;

program code for ordering the code subsets by the combination of coverage measure and at least one concern based criteria; and program code for outputting to a user the ordered code subsets.

* * * * *